US005602726A

United States Patent [19]

Sakai

[11] Patent Number: 5,602,726

[45] Date of Patent: Feb. 11, 1997

[54] UNINTERRUPTIVE SWITCHING REGULATOR

[75] Inventor: Setuo Sakai, Suita, Japan

[73] Assignee: Nihon Protector Co., Ltd., Suita, Japan

[21] Appl. No.: 601,403

[22] Filed: Feb. 14, 1996

[30] Foreign Application Priority Data

Sep. 22, 1995 [JP] Japan .................................... 7-244986

[51] Int. Cl.$^{6}$ .................................................. H02M 3/335

[52] U.S. Cl. ................................................ 363/55; 363/21

[58] Field of Search ............................ 320/21–24, 31–32, 320/39–40, 5–6, 15–17, 20; 363/18–19, 131–132, 21, 47, 48, 67, 56, 97, 2, 22, 23, 39, 40, 142–143, 79, 14, 55

[56] References Cited

U.S. PATENT DOCUMENTS

| | | | |
|---|---|---|---|
| 4,422,032 | 12/1983 | Kakumoto et al. | 320/39 |
| 4,649,464 | 3/1987 | Shono | 363/21 |
| 5,008,794 | 4/1991 | Leman et al. | 363/21 |
| 5,471,376 | 11/1995 | Tsai et al. | 363/20 |

*Primary Examiner*—Aditya Krishnan
*Attorney, Agent, or Firm*—Armstrong, Westerman, Hattori, McLeland & Naughton

[57] ABSTRACT

An uninterruptive switching regulator includes, at a primary side, a rectifier circuit, a primary winding of a high-frequency transformer, a primary side switching element, and a switching primary winding, and at a secondary side, a secondary side output circuit having a rectifying and smoothing circuit connected, and at a tertiary side, a tertiary winding, a charge and discharge circuit, a tertiary side switching element, an electrical double layer capacitor, and a switching tertiary winding, respectively. An output is transmitted from the primary side and tertiary side to the secondary side by the flyback system, and when the output voltage of the rectifier circuit at the primary side exceeds a predetermined level, the charge circuit operates, whereas when it does not exceed the predetermined level, the discharge circuit operates.

1 Claim, 5 Drawing Sheets

RCC1
RCC2
VIN
Vo
Ic'
Ic
ID
I1S
I1
I2
I3
I3S
I4
I5
E
A
1
3
5
7
9
11
13
15
17
19
21
23
25
27
29
31
33
35
37
39
41

UNINTERRUPTIVE SWITCHING REGULATOR

BACKGROUND OF THE INVENTION

1. Field of the Invention

The present invention relates to an uninterruptive switching regulator which has a high power factor and is reduced in a higher harmonic component in a primary-side a.c. input current as well as an output ripple, and more particularly to a technique for realizing an uninterruptive switching regulator of the serf-excitation type which is reduced in the number of parts, downsized and inexpensive.

2. Description of the Related Art

In recent years, as computer equipments have been spread, attention has been given to an influence of a momentary power failure on a commercial power supply. A variety of uninterruptive d.c. regulated power supplies have been proposed, one of which has been disclosed in Japanese Patent Unexamined Publication No. Hei 6-205546 which has already been proposed by the present inventor. This includes a basic circuit shown in FIG. 6, which is comprised of: (1) a rectifier circuit 102 having no smoothing circuit for rectifying an alternating current from an a.c. power supply 100; (2) a primary side circuit 110 in which a primary winding 106 of a high-frequency transformer 104 and a primary side switching element 108 are connected in series to an output side of the rectifier circuit 102, to develop a primary side high frequency pulse voltage through the primary side switching element 108; (3) a secondary side circuit 116 in which a rectifying and smoothing circuit is connected to a secondary winding 112 of the above high-frequency transformer 104, to supply a d.c. output voltage to a load 114; (4) a charge circuit 126 in which an electrical double layer capacitor 120, a choke coil 122 and a high-frequency rectifier diode 124 are connected in series to a tertiary winding 118 of the above high-frequency transformer 104; (5) a discharge circuit 132 in which the above electrical double layer capacitor 120 and a tertiary side switching element 130 are connected in series between a winding start portion of the above tertiary winding 118 and a winding end portion thereof or a tap 128 drawn out from the middle portion of that winding; and (6) a pulse width modulation control switching control circuit 134 which outputs a pulse signal in synchronism with the above primary side switching element 108 and the tertiary side switching element 130 to perform a switching operation and also modulates the pulse width of a pulse signal in response to the fluctuation of an output voltage of the above secondary side circuit 116 to control the pulse width of the primary side high-frequency pulse voltage.

The conventional uninterruptive switching regulator like this operates as follows: When the output voltage of the rectifier circuit 102 exceeds a predetermined level, a sine-wave alternating current supplied from the a.c. power supply 100 is supplied to the primary side of the high-frequency transformer 104 in the form of a full-wave sine-wave pulsating current waveform. Then, the full-wave sine-wave pulsating current flows in the primary side switching element 108 through the primary winding 106 and a reverse current preventing diode 136, and is chopped while being controlled by the switching control circuit 134, then being outputted to the secondary side circuit 116.

Also, when the output voltage of the rectifier circuit 102 exceeds a predetermined level, a current $_1$, which flows in the primary side circuit 110 when the primary side switching element 108 is on, causes a current $i_2$ shown in the figure to flow in a tertiary side circuit 138. The current $i_2$ is smoothed by the choke coil 122 and charges the electrical double layer capacitor 120.

On the other hand, when the output voltage of the rectifier circuit 102 does not exceed the predetermined level, the charged voltage of the electrical double layer capacitor 120 becomes higher than an induced voltage of the tertiary winding 118 which is caused by the current $i_1$, with the result that a discharge current $i_3$ flows through a winding portion between the winding start portion of the tertiary winding 118 and the halfway tap 128. The discharge current $i_3$ is chopped by the tertiary side switching element 130 and outputted to the secondary side circuit 116.

With such operation, a given secondary-side output can be obtained even when the momentary power failure, etc., make the output voltage of the rectifier circuit 102 low, resulting in an uninterruptive switching regulator.

However, the conventional uninterruptive switching regulator suffers from such a problem that its separate excitation type makes it difficult to downsize the device and to lower the costs. In other words, in the above-mentioned conventional uninterruptive switching regulator, the pulse width modulation control circuit (PWM) 134 is used for the purpose of obtaining the primary side pulse voltage, which is a basic part separately controlled and separately attached. The requirement of such a basic part which is separately controlled and separately attached causes not only an increase in the number of parts but also an increase in the costs, which is not preferred.

SUMMARY OF THE INVENTION

The present invention has been made to solve the above-mentioned problems, and therefore an object of the invention is to provide an uninterrupted switching regulator of the self-excitation type which is capable of reducing the costs and being downsized.

To solve the above-mentioned problem, the present invention has been achieved by the provision of art uninterrupted switching regulator, which comprises a rectifier circuit for rectifying an alternating current from an a.c. power supply; a primary side circuit for developing a primary side high frequency pulse voltage through a primary side switching element in which a primary winding of a high-frequency transformer and the primary side switching element are connected in series to an output side of the rectifier circuit, and a switching primary winding for applying a switching control voltage to the primary side switching element is connected to the output side of the rectifier circuit; a secondary side circuit for applying a d.c. output power to a load in which a rectifying and smoothing circuit is connected to a secondary winding of said high-frequency transformer; a charge circuit Connected in series to a first tertiary winding of the high-frequency transformer and including an electrical double layer capacitor or a secondary bakery and a rectifying device; and a discharge circuit in which a second tertiary winding connected in series to said first tertiary winding, a tertiary side switching element and said electrical double layer capacitor or secondary battery are connected in series to each other, and a switching tertiary winding for applying a switching control voltage to the tertiary side switching element is connected thereto, for developing a primary side high-frequency pulse discharge voltage from the discharge output of the electrical double layer capacitor or the secondary battery through said tertiary side switching element, in which an output is transmitted from the primary side and the tertiary side to the secondary side through the flyback system, and said charge circuit operates when the output voltage of said rectifier circuit at the primary side exceeds a predetermined level, whereas said discharge circuit operates when it does not exceed the predetermined level. In this construction, a smoothing capacitor may be provided in the rectifier circuit, but since power factor is improved more in the case of the provision of no smoothing capacitor, the smoothing capacitor may be omitted as occasions demand.

In other words, in the uninterruptive switching regulator in accordance with the present invention, the output transformer of one switching circuit of the RCC (ringing choke converter) system which inputs a commercial a.c. is common in the magnetic path of an iron core to the output transformer of the other switching circuit of the RCC system using the charged energy stored in the electrical double layer capacitor or the secondary battery as an input source. As a result, the switching operation (a timing of turning on/off) of the primary side switching element completely synchronizes with that of the tertiary side switching element, and the higher potential of the commercial a.c. or the d.c. input of the electrical double layer capacitor or secondary battery is automatically preferentially effected by self-exciting operation, resulting in the uninterruptive switching regulator.

In other words, the output supply from the RCC circuit at the commercial a.c. side is usually preferentially effected. In this case, the electrical double layer capacitor or the secondary battery is charged with a constant voltage or constant current directly or through a regulator or the like by an electromotive voltage induced in the tertiary winding, for an unexpected situation such as a power failure. At the time of the power failure, the RCC circuit at the commercial a.c. side is automatically switched to the RCC circuit using the energy from the electrical double layer capacitor or secondary battery which have been charged as an input source, to thereby supply an output from the first tertiary winding.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENTS

Figure 1:
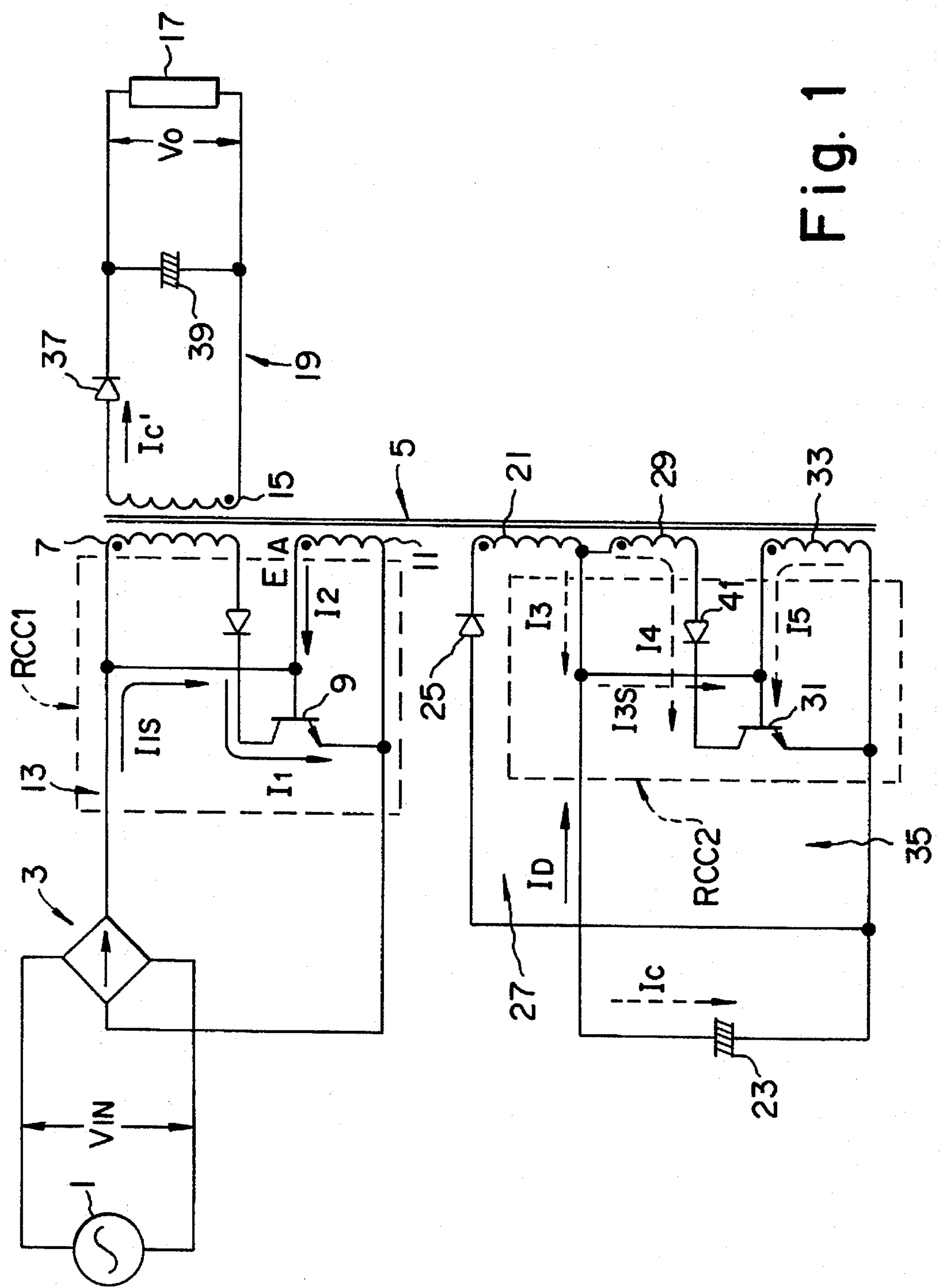
FIG. 1 is a circuit diagram explanatorily showing the principle of an uninterruptive switching regulator in accordance with the present invention.

Now, a description will be given of an embodiment of the present invention with reference to FIG. 1 showing the principle of an uninterruptive switching regulator of the invention. FIG. 1 is a diagram for explaining the principle of the present invention, in which parts other than main parts for explanation are omitted therefrom.

Shown in the figure is a basic circuit of an uninterruptive switching regulator which comprises: a rectifier circuit 3 for rectifying an alternating current from an a.c. power supply 1; a primary side circuit 13 for developing a primary side high frequency pulse voltage through a primary side switching element 9 in which a primary winding 7 of a high-frequency transformer 5 and the primary side switching element 9 are connected in series to an output side of the rectifier circuit 3, and a switching primary winding 11 for applying a switching control voltage to the primary side switching element 9 is connected to the output side of the rectifier circuit 3; a secondary side circuit 19 for applying a d.c. output power to a load 17 in which a rectifying and smoothing circuit is connected to a secondary winding 15 of said high-frequency transformer 5; a charge circuit 27 connected in series to a first tertiary winding 21 of the high-frequency transformer 5 and including an electrical double layer capacitor 23 or a secondary battery 23 and a rectifying device 25; and a discharge circuit 35 in which a second tertiary winding 29 connected in series to said first tertiary winding 21, a tertiary side switching element 31 and said electrical double layer capacitor 23 or secondary battery 23 are connected in series to each other, and a switching tertiary winding 33 for applying a switching control voltage to the tertiary side switching element 31 is connected thereto, for developing a primary side high-frequency pulse discharge voltage from he discharge output of the electrical double layer capacitor 23 or the secondary battery 23 through said tertiary side switching element 31; wherein an output is transmitted from the primary side and the tertiary side to the secondary side through the flyback system, and said charge circuit operates when the output voltage of said rectifier circuit at the primary side exceed a predetermined level, whereas said discharge circuit operates when it does not exceed the predetermined level.

Figure 2:
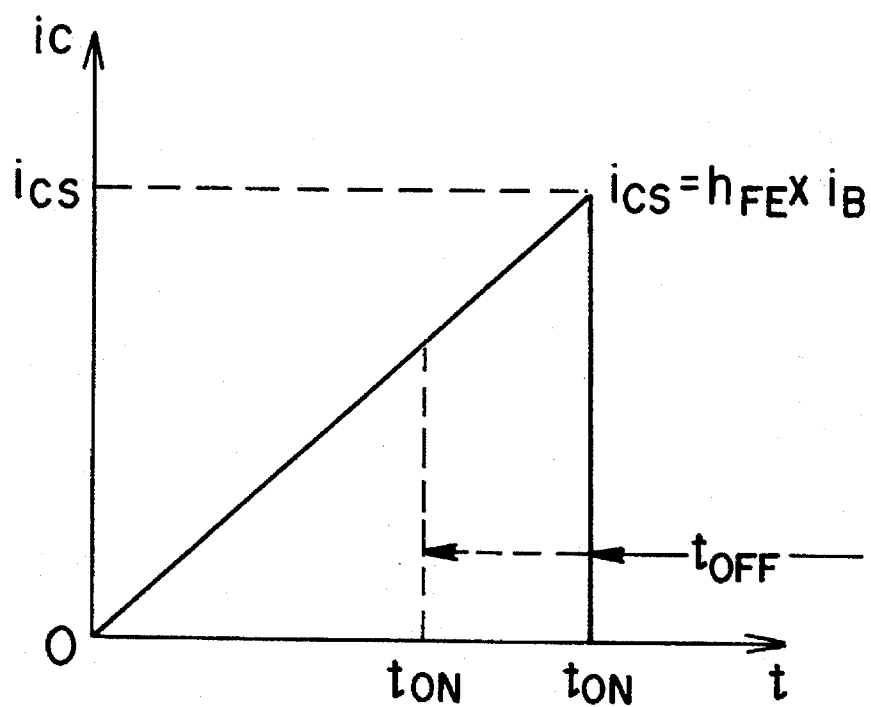
FIG. 2 is a graph representing a switching element characteristic used for explanation of the principle of the uninterruptive switching regulator in accordance with the present invention.

Hereinafter, a description will be given of an operation of the uninterruptive switching regulator in accordance with the present invention with reference to FIG. 1. Upon applying of an a.c. voltage $V_{IN}$ as an input, a full-wave sine-wave pulsating current obtained by the rectifier circuit 3 flows as a base current $I_{1S}$ of the primary side switching element 9 (transistor 9), and the primary side switching element 9 turns on. Upon turning on of the primary side switching element 9, the output voltage of the rectifier circuit 3 is applied to the primary winding 7 in the high-frequency transformer 5, which makes a current $I_1$ flow. With this, an induced voltage $E_A$ corresponding to the respective turn ratios is developed in the switching primary winding 11, thereby allowing a current $I_2$ which forms a base current to flow. In this situation, since the secondary winding 15 is connected as shown in the figure, the polarity of a diode 37 becomes reversed so that no current flows in the secondary side circuit 19. Also, since the voltage $E_A$ is applied to a polarity by which the primary side switching element 9 turns on, the primary side switching element 9 is held in an on-state. However, as shown in FIG. 2, since a collector current $i_c$ of the primary side switching element 9 increases linearly, when it comes to $i_{cs}$ (that is, a product of a current amplification factor $h_{FE}$ and a base current $i_B$) after a certain period of time $t_{on}$ elapsed, there is no change in the current $i_{cs}$, which causes no change in the magnetic flux within the iron core of the high-frequency transformer 5. As a result, a current becomes zero instantly, and a counter-electromotiv e force caused by the interruption of the current $i_{cs}$ is developed in the respective windings. Also, the polarity of the voltage $E_A$ is reversed, and the primary side switching element 9 is reversely biased and turned off.

Upon turning off of the primary side switching element 9, the counter-electromotive force is developed in the respective wirings of the high-frequency transformer 5, whereby the magnetic energy stored in the iron core of the transformer from the secondary winding 15 through the diode 37 flows out as a charge current $I_{c'}$ to the smoothing capacitor 39 through the flyback system. Then, the charge current $I_{c'}$ makes the smoothing capacitor 39 charged, and is smoothed before being taken out as an output voltage $V_0$ from the secondary side circuit 19. Thereafter, the charge current $I_{c'}$ becomes zero after a certain period of time elapsed, and a voltage applied from the switching primary winding 11 to the base of the switching element 9 as a reverse voltage disappears. As a result, the primary side switching element 9 is again turned on by a current $I_{1S}$, and the switching operation is continued by the same operation as that described above. The frequency of the switching operation is determined by the rising rate of the collector current $i_c$ shown in FIG. 2, but this is set to an appropriate value by the design of circuit constants.

On the other hand, since the first tertiary winding 21 and the second tertiary winding 29 are wound in directions shown in the figure, when the current $I_1$ flows in the primary winding 7, an electromotive force is developed in a direction in which no current flows by two diodes 25 and 41. Then, upon turning off of the primary side switching element 9, counter-electromotive forces are developed in the first tertiary winding 21 and the second tertiary winding 29, respectively, and the switching tertiary winding 33 is wound in a direction show in the figure. Therefore, the charge current $I_3$ and a current $I_{3S}$ which forms the base current of the tertiary side switching element 31 (transistor 31) flow so that the tertiary side switching element 31 becomes in the on-state. However, because a voltage induced in the second tertiary winding 29 is reverse to a direction in-which the current $I_3$ flows, no collector current $I_4$ of the tertiary side switching element 31 flows, as a result of which the tertiary side switching element 31 becomes in a no-load running state. Hence, the electrical double layer capacitor 23 is finally charged by the charge current $I_c$ caused by the electromotive voltage induced in the first tertiary winding 21.

Then, upon the interruption of the output voltage of the rectifier circuit 3 because of a momentary power failure or the like, a voltage across the electrical double layer capacitor 23 allows the base current $I_{3S}$ to flow instead of the input of the rectifier circuit 3, to thereby turn on the tertiary side switching element 31, and a discharge current $I_D$ flows via the second tertiary winding 29 with the charged energy in the electrical double layer capacitor 23 as an input source. In this state, the tertiary side switching element 31 repeats the switching operation by the base current $I_{3S}$ and $I_5$ with the same operation as that of the primary side switching element 9 in the above-mentioned primary side circuit 13, and the discharge current $I_D$ from the electrical double layer capacitor 23 is chopped by the tertiary side switching element 31 and then outputted to the secondary side circuit 19.

Figure 3:
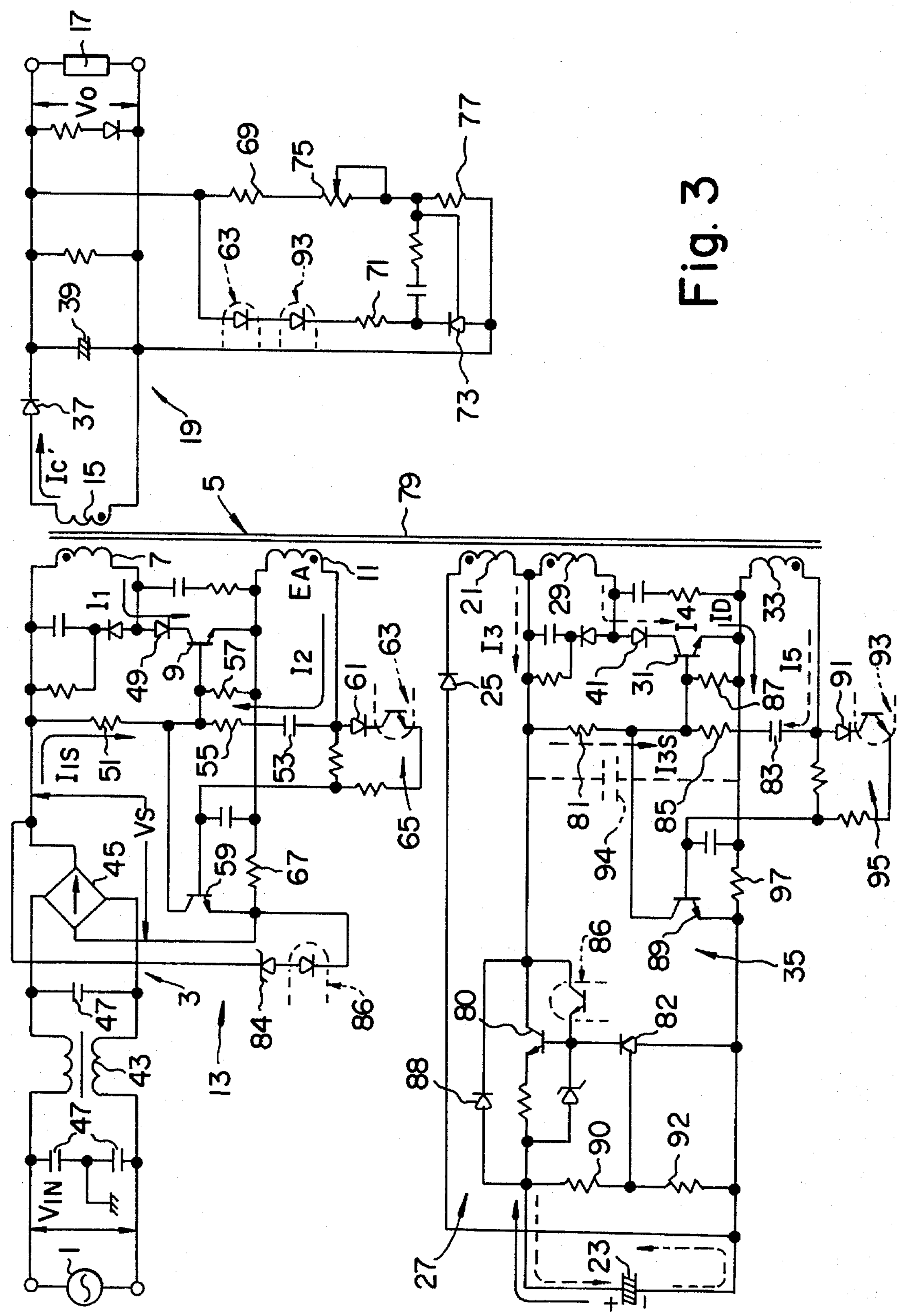
FIG. 3 is a circuit diagram explanatorily showing an example of a circuit of the uninterruptive switching regulator in accordance with the present invention.

Subsequently, a description will be given in more detail of the present invention on the basis of specified embodiments. FIG. 3 is a circuit diagram explanatorily showing an example of a circuit of the uninterruptive switching regulator in accordance with the present invention. Hereinafter, a description will be given in more detail on the basis of FIG. 3.

A rectifying device 45 is connected to an a.c. power supply 1 through a line filter 43 to constitute a rectifier circuit 3. In this example, a capacitor 47 functions as a filter for filtering a noise which is generated at the time of the switching operation. At the output side of the rectifier circuit 3, a primary winding 7 of a high-frequency transformer 5 and a primary side switching element 9 (transistor 9) are connected in series to each other through a diode 49. A switching primary winding 11 which applies a control voltage is connected to the switching terminal of the primary side switching element 9, that is, the base of the transistor 9 in the figure. The polarity of the switching primary winding 11 is set as shown in the figure. Also, the output side of the rectifier circuit 3 and the base of the transistor 9 are connected to each other through a resistor 51 so that a base current $I_{1s}$ for turning on the transistor 9 flows. The winding start of the switching primary winding 11 and the base of the transistor 9 are connected to each other through a d.c. component cut capacitor 53 and a resistor 55, and a resistor 57 for base voltage adjustment is connected between the winding end of the switching primary winding 11 and the base of the transistor 9. The collector of a transistor 59 for bypassing the base current of the transistor 9 is connected between the winding end of the switching primary winding 11 and a node between the resistor 51 and the base of the transistor 9. The base of the transistor 59 is connected to the winding start of the switching primary winding 11 through a diode 61 and a photo-coupler 63 to constitute a constant-voltage control circuit 65. A resistor 67 connected to the emitter of the transistor 59 is provided for an over-current detection of a current flowing in the primary winding 7 as the emitter current of the transistor 9. With such a structure, a primary side circuit 13 for generating a primary side high-frequency pulse voltage is formed. In this example, an FET may be used for the transistor 9 instead of a bipolar transistor.

To the secondary winding 15 connected to the reversed polarity to the primary winding 7 of the above-mentioned high-frequency transformer 5, there is provided a secondary side circuit 19 to which a rectifying and smoothing circuit comprised of the diode 37 and the smoothing capacitor 39 is connected, to thereby supply a d.c. output power to the load 17. Further, a photo-diode of photo-couplers 63 and 93 is provided for comparing a voltage which has been divided into a voltage detection voltage-divided resistor 69, a variable resistor 75 and a detection resistor 77 with the internal reference voltage of a comparative amplifying IC 73 which is called "a shunt regulator" to perform a constant-voltage control.

A first tertiary winding 21 which is wound in the same direction as that of the primary winding 7 is disposed on an iron core 79 which is common to that of the primary winding 7. In addition, the rectifying diode 25, the constant-voltage constant-current control transistor 80, and the electrical double layer capacitor 23 are connected in series to each other, to thereby form a charge circuit 27. In this example, a secondary battery may be used instead of the electrical double layer capacitor 23.

Further, the second tertiary winding 29 is connected to the above first tertiary winding 21 so as to have the same polarity. Also, the second tertiary winding 29 and the tertiary side switching element 31 (transistor 31) are connected in series through the diode 41, and the switching tertiary winding 33 is connected to the switching terminal of the tertiary side switching element 31, in the figure, the base of the transistor 31 so as to apply a control voltage thereto. The switching tertiary winding 33 is reverse in polarity to the above two tertiary windings 21 and 29. Also, the plus side of the electrical double layer capacitor 23 and the base of the transistor 31 are connected to each other through a resistor 81 in such a manner that the base current $I_{3s}$ for turning on the transistor 31 flows therein. The winding start portion of the switching tertiary winding 33 and the base of the transistor 31 are connected to each other through a d.c. component cut capacitor 83 and a resistor 85 whereas a base voltage adjustment resistor 87 is connected between the winding end portion of the switching tertiary winding 33 and the base of the transistor 31. A transistor 89 for allowing the base current of the transistor 31 to be bypassed is disposed between a node between the resistor 81 and the base of the transistor 31 and the winding end portion of the switching tertiary winding 33. The base of the transistor 89 is connected to the winding start portion of the switching tertiary winding 33 through a diode 91 and the photo-coupler 93, to thereby constitute a constant-voltage control circuit 95. A resistor 97 connected to the emitter of the transistor 89 is so designed as to detect an over-current of the emitter current of the transistor 31, which flows in the second tertiary winding 29. The discharge circuit 35 is constituted as described above.

Subsequently, a description will be given of the operation of the uninterruptive switching regulator. Upon applying of the a.c. voltage $V_{IN}$ as an input, a full-wave sine-wave pulsating current obtained by the rectifier circuit 3 flows as the base current $I_{1S}$ of the transistor 9 through the resistor 51, with the result that the transistor 9 turns on. Upon turning on of the transistor 9, the output voltage $V_s$ of the rectifier circuit 3 is applied to the primary winding 7 of the high-frequency transformer 5, which makes a current $I_1$ flow through the diode 49. With this, a voltage $E_A$ corresponding to the turn ratio of the switching primary winding 11 to the primary winding 7 is developed in the switching primary winding 11, thereby allowing a current $I_2$ which forms a base current to flow through the capacitor 53 and the resistor 55 so as to deeply biassing the base of the transistor 9.

In this situation, since the secondary winding 15 is reverse in polarity to the primary winding 7, the polarity of the diode 37 becomes reversed so that no current flows in the secondary side circuit 19, and a magnetic energy is stored in the iron core 79.

Also, since the above voltage $E_A$ is applied to a polarity by which the transistor 9 turns on, the transistor 9 is held in the on-state. The base voltage at this time is adjusted to an appropriate value by the resistor 57. Then, as was already described with reference to FIG. 2, since the collector current $i_c$ of the transistor 9 increases linearly, when it comes to a product of the current amplification factor $h_{FE}$ and the base current after a certain period of time elapsed, the collector current ceases to increase, and there is no change in the current. As a result, the direction of the electromotive force of the respective windings is reversed in such a manner that the induced voltage $E_A$ of the switching primary winding 11 becomes a reversed voltage. As a result, the transistor 9 truns off rapidly.

Upon turning off of the transistor 9, the magnetic energy stored in the iron core 79 is developed as a counter-electromotive power in the respective windings of the high-frequency transformer 5, the charge current $I_{c'}$ of the smoothing capacitor 39 flows out from the secondary winding 15 through the diode 37. Then, the charge current $I_{c'}$ makes the smoothing capacitor 39 charged, and is smoothed before being taken out as the output voltage $V_0$ from the secondary side circuit 19. Thereafter, since the charge current $I_{c'}$ becomes zero after a certain period of time elapsed, because of the discharge of the magnetic energy. Therefore, a voltage biassed deeply in a direction in which the base of the transistor 9 turns off disappears, and the current $I_{1s}$ flows through the resistor 51 as the base current of the transistor 9 so that the transistor 9 turns on again. Thus, the switching operation is continued in the same manner as described above.

When the output voltage $V_0$ exceeds a predetermined set value, then the divided voltage of the secondary side constant-voltage control detection resistor 77 becomes higher than the gate voltage of a shunted regulator 73 so that the luminance of an emitter diode in the photo-coupler 63 (and 93) is enhanced, and the emitter current of a photo-transistor in the photo-coupler 63 (and 93) positioned at the primary side is increased. Also, the base current of the transistor 59 flows through the diode 61 and the photo-coupler 63 with the forward voltage of the switching primary winding 11 as a voltage source, to thereby make the base potential of the transistor 59 rise. In response thereto, as a result that a current flowing through the transistor 59 is increased, the operation timing of the transistor 59 is made fast. As a result, the base voltage of the transistor 9 is lowered so that a period $t_{ON}$ is shortened as shown in FIG. 2 whereas a period $t_{OFF}$ is lengthened. In this way, the PWM operation is conducted in such a manner that the output voltage $V_0$ is held a predetermined constant voltage. On the other hand, when the output voltage $V_0$ does not exceed the predetermined set value, the period $t_{on}$ is lengthened inversely, and the PWM operation is conducted so that the output voltage $V_0$ becomes the predetermined constant voltage.

Also, since the first tertiary winding 21 has the same polarity as that of the primary winding 7, when the current $I_1$ flows in the primary winding 7, that is, when the transistor 9 is on, an electromotive force is generated in a direction in which no current flows by the diode 25. The second tertiary winding 29 also has the same winding direction as that of the primary winding 7, and therefore even in this case, the diode 41 makes no current flow. Further, since the switching tertiary winding 33 is opposite in winding direction to the primary winding 7, the transistor 31 turns on. However, because the potential of the second tertiary winding 29 is higher than the potential of the electrical double layer capacitor 23, no current $I_4$ flows.

On the other hand, when the transistor 9 turns off, the electromotive forces generated in the first tertiary winding 21, the second tertiary winding 29 and the switching tertiary winding 33, respectively, are reversed, with the result that the charge current $I_3$ flows as the charge current ($I_c$) of the electrical double layer capacitor 23 while being limited by the transistor 80 which operates as a dropper, to thereby conduct the charging operation. Then, the electrical double layer capacitor 23 is charged up to a constant voltage level which is determined by the shunted regulator 82.

When the transistor 9 is off, the base of the transistor 31 becomes a reverse bias because the electromotive force of the switching tertiary winding 33 is reverse in direction, to thereby turn off in synchronism with the transistor 9.

As is apparent from the above description, the RCC circuit at the rectifier circuit 3 side (commercial a.c. input side) and the RCC circuit at the electrical double layer capacitor 23 side operate in complete synchronism with each other.

Then, when the output voltage of the rectifier circuit 3 is lowered because of a momentary power failure or the like, the charge voltage of the electrical double layer capacitor 23 becomes higher than the induced voltage of the second tertiary winding 29 with the result that while the transistor 31 is on, which operates in synchronism with the transistor 9, the discharge current $I_D$ flows as $I_4$, and the output voltage of the secondary side circuit 19 is held at a constant voltage. In other words, when the transistor 31 is on, the discharge current $I_4$ flowing in the second tertiary winding 29 allows an induced voltage to be developed in the switching tertiary winding 33, and the current $I_5$ which allows the transistor 31 to be held in the on-state flows through the capacitor 83 and the resistor 85, to thereby deeply bias the base of the transistor 31. Hence, the switching operation is repeated in the same manner as the operation of the transistor 9 in the above-mentioned primary side circuit 13, and the discharge current $I_D$ from the electrical double layer capacitor 23 is chopped by means of the transistor 31 and outputted to the secondary side circuit 19 to thereby exhibit the uninterruptive property.

Also, when the a.c. input voltage does not exceed a voltage level which is determined by a Zener diode 84 and regarded as a power failure, because the photo-coupler 86 connected in series to the Zener diode 84 turns off, the photo-transistor of the photo-coupler 86 also turns off, as a result of which the charge path from the first tertiary winding 21 is interrupted. This is because there arises such a problem that the switching loss is increased in the practical use unless the charge caused by a return feedback energy is offset by an energy derived from the electrical double layer capacitor 23.

Similarly, in the discharge state from the electrical double layer capacitor 23, when the secondary side output voltage $V_0$ becomes higher than the discharge voltage, that is, when the divided voltage of the secondary side constant-voltage control detection resistor 77 exceeds a gate voltage which is a reference voltage of the shunted regulator 73, then the shunted regulator 73 operates in the on-direction so that the current of the emitter diode in the photo-coupler 93 increases. Then, the emitter current of the photo-resistor in the photo-coupler 93, which is positioned at the primary side, flows through the diode 91 and the photo-transistor of the photo-coupler 93 with the forward voltage of the switching tertiary winding 33 as a source, which causes the base voltage of the transistor 89 to rise. As a result, the operation timing of the transistor 89 is made fast so that the period $t_{ON}$ of the transistor 31 is shortened whereas the period $t_{OFF}$ is lengthened. For that reason, the magnetic energy stored in the iron core 79 is reduced, and the PWM control operation is conducted in such a manner that the output voltage of the secondary side circuit 19 becomes a predetermined constant voltage.

As described above, the regulator for the electrical double layer capacitor 23 is comprised of the transistor 80, the shunted regulator 82 and the photo-coupler 86. In this example, the diode 88 acts as a bypass diode only when discharging, and the resistors 90 and 92 are a partial-potential resistor for detection of a charge voltage to the electrical double layer capacitor 23 and a detection resistor, respectively.

Subsequently, a description will be given of the effect of an improvement in the power factor and the uninterruptive property of the switching regulator in accordance with the present invention and with reference to FIG. 4. It should be noted that in the graph of FIG. 4, a voltage V is taken in the axis of ordinates whereas an elapsed time t is taken in the axis of abscissa.

Figure 4A:
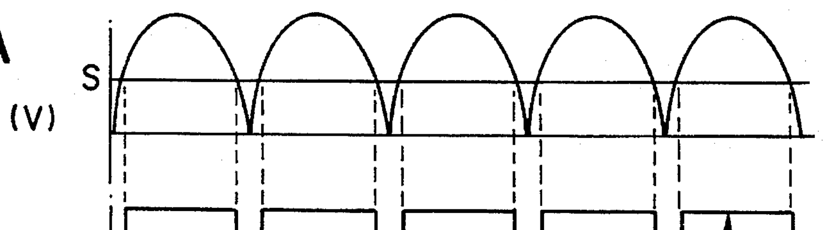
FIG. 4 is a graph representing the voltage waveforms of the interruptive switching regulator in accordance with the present invention, in which reference mark A denotes an output waveform of a rectifier circuit; B, an output voltage waveform of a secondary side circuit in the case where no charge and discharge circuit is provided; C, an output voltage waveform of the secondary, side circuit, which is obtained by a discharge power from the electrical double layer capacitor; and D, an output voltage waveform of the secondary side circuit, which is obtained over all time regions.
Figure 4B:
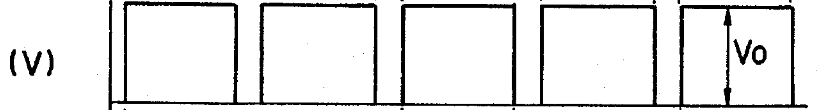
Figure 4C:
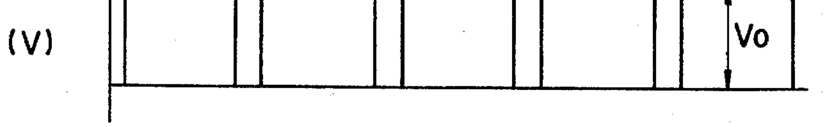

As described above, the sine-wave a.c. applied from the a.c. power supply 1 is rectified by the rectifying device 45 into a full-wave sine-wave pulsating current waveform shown in FIG. 4A and supplied to the primary side of the high-frequency transformer 5. In this situation, it is converted into a high-frequency pulse voltage through the switching operation of the transistor 9 and outputted to the secondary side circuit 19 by the flyback system. Since the chopping frequency at this time is determined by the collector current, current amplification factor and base current of the transistor 9 as shown in FIG. 2, it is actually set by circuit constants. In the present invention, the RCC 1 arranged at the a.c. power supply 1 side and the RCC 2 arranged at the electrical double layer capacitor 23 side are connected in parallel with each other with the magnetic path of the iron core of the high-frequency transformer 5 as a common magnetic path, but, whether the energy supply to the secondary side circuit 19 is conducted by the RCC1 or the RCC2 is as follows:

It is assumed that the number of turns of the primary winding 7 is $N_1$, the number of turns of the second tertiary winding 29 is $N_3$, the input voltage of the RCC1 is $V_{A1}$, and the input voltage of the RCC2 is $V_{B1}$. Then, the specific voltage at the primary winding 7 side is $V_{A1}/N_1$, and the specific voltage at the second tertiary winding 29 side is $V_{B1}/N_3$, respectively, and an output energy is supplied to the secondary side circuit 19 from the higher specific voltage.

Hence, when the a.c. input voltage is lowered, a mean voltage level for charging the electrical double layer capacitor 23 from the first tertiary winding 21 is made constant similarly to the output voltage of the secondary side circuit 19 up to a voltage level at which the constant-voltage energy can be supplied to an output as a result of the pulse width modulation switching operation at the side of the RCC1. Therefore, the RCC 2 side cannot constitute the energy supply source to the secondary side circuit 19. In this situation, the RCC 2 side is in a no-load running state, and the first tertiary winding 21 functions as a charge circuit for the electrical double layer capacitor 23. In this case, if the voltage at the RCC 1 side is lowered to a level at which the output voltage of the secondary side circuit 19 cannot be controlled by constant voltage, because the specific voltage level at the RCC 2 side is higher than that at the RCC 1 side, the output supply is automatically switched to the RCC2 side with no momentary interruption. Such a voltage level at the RCC 1 side that the output voltage of the secondary side circuit 19 cannot be controlled by constant voltage is hereinafter referred to as "a slice level" (indicated by S in the figure). A voltage higher than that slice level is actually detected by the Zener diode 84, and the regulator transistor 80 of the charge circuit may be interrupted as described above.

It is assumed that the charge and discharge circuits 27 and 35 do not exist at the tertiary side. Then, the output voltage $V_0$ of the secondary side circuit 19 appears in the form of a square voltage waveform which is synchronous with the frequency of the a.c. power supply shown in FIG. 4B. However, when the voltage of the full-wave sine-wave pulsating current shown in FIG. 4A is not higher than a slice level S, the charge voltage of the electrical double layer capacitor 23 becomes higher than the induced voltage of the first tertiary winding 21 as described above. As a result, the discharge current flows into the second tertiary winding 29 from the electrical double layer capacitor 23, and also the discharge current is switched by the transistor 31, with the result that the high-frequency pulse voltage is outputted from the discharge circuit 35 to the secondary side circuit 19. The output voltage $V_0$ of the secondary side circuit 19 at this time has a waveform shown in FIG. 4C, and appears in the form of a waveform which makes up the gap portions of the voltage waveform in a region where the voltage is higher than the slice level S of the full-wave sine-wave pulsating current shown in FIG. 4B.

Figure 4D:
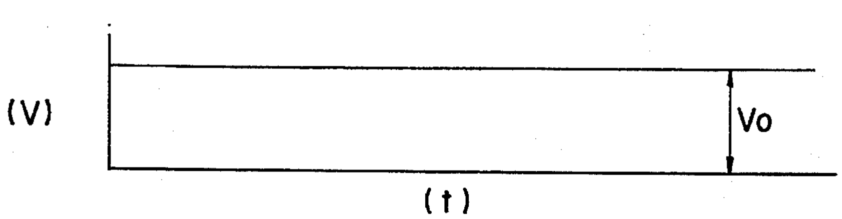

Therefore, as shown in FIG. 4D, the flat output voltage $V_0$ which has no concave over all time regions is outputted from the secondary side circuit 19. In this way, since the switching regulator of the present invention supplies the discharge power from the electrical double layer capacitor in a region where the input voltage is not higher than the slice level, an extremely enhanced power factor can be realized. It is needless to say that even in the case of a momentary power failure, the output voltage $V_0$ of a waveform shown in FIG. 4D is obtained by the like operation.

Figure 5A:
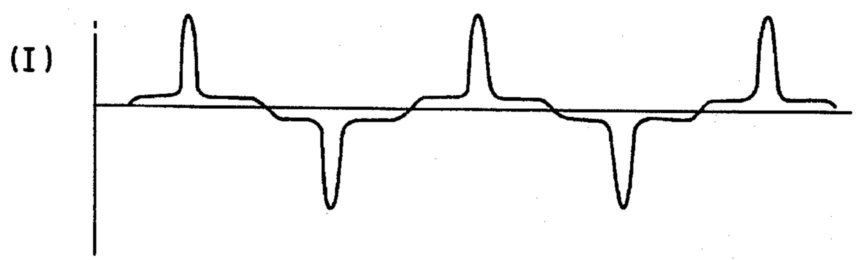
FIG. 5 is a graph representing current waveforms of a conventional switching regulator and the uninterruptive switching regulator in accordance with the present invention, viewed from an a.c. input side.
Figure 5B:
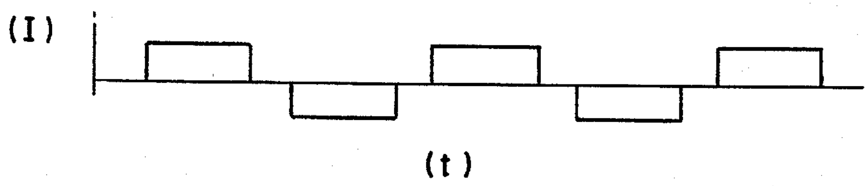
Figure 6:
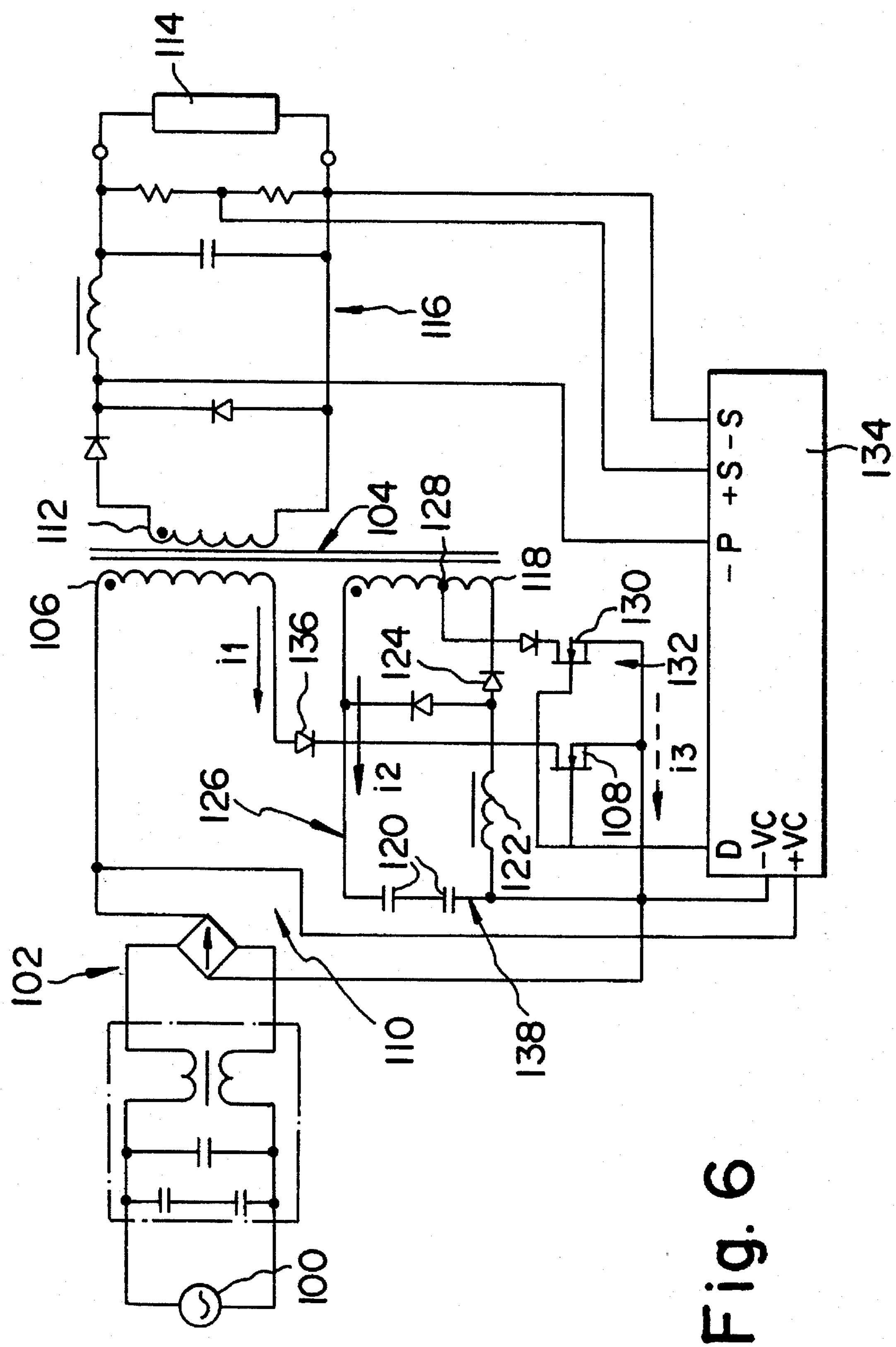
FIG. 6 is a circuit diagram showing a conventional uninterruptive switching regulator.

Also, in the circuit examples shown in FIGS. 1 and 3, no smoothing capacitor is provided at the rectifier circuit 3 side, and the electrical double layer capacitor 23 functions as the conventional smoothing capacitor at the rectifier circuit side. Therefore, as shown in FIG. 5, the current waveform viewed from the a.c. input side was a waveform where a large current is concentrated for an extremely short period of time as indicated by reference mark A in the figure in the conventional switching regulator having the smoothing capacitor, but is a relatively flat current waveform as indicated by reference mark B in the figure in the switching regulator in accordance with the present invention. As a result, a load to the circuit is extremely reduced, and an improvement in the power factor can be realized.

Furthermore, for example, in the circuit of FIG. 3, an electrolytic capacitor 94 is disposed, and its charge voltage is set slightly higher than the electrical double layer capacitor 23 so that the supply of an energy lower than the slice level in a stationary running operation is conducted by the electrolytic capacitor 94, and at the time of a power failure, etc., after the discharge from the electrolytic capacitor 94 for an extremely short period of time has been finished, an energy may be supplied from the electrical double layer capacitor 23. With such an operation, a load on the electrical double layer capacitor 23 is reduced.

The present invention is not limited by or to the above-mentioned embodiments, and for example, in FIGS. 1 and 3, a solar cell panel is connected to the electrical double layer capacitor 23 as a backup power supply at the time of a power failure, or RCC circuits such as RCCs 3, 4, . . . are added thereto, and a diesel generator, a wind power generator, etc., are connected to the respective RCC circuits so as to provide an uninterruptive power supply (energy best mix) using a total energy.

As was described above, according to the present invention, the output supply from the RCC circuit at the commercial a.c. side is usually preferentially effected. In this case, the electrical double layer capacitor or the secondary battery is charged with a constant voltage or constant current directly or through a regulator or the like by an electromotive voltage induced in the tertiary winding, for an unexpected situation such as a power failure. At the time of the power failure, the RCC circuit at the commercial a.c. side is automatically switched to the RCC circuit using the energy from the electrical double layer capacitor or secondary battery which have been charged as an input source, to thereby supply an output from the second tertiary winding. Accordingly, an excellent uninterruptive property can be ensured with an extremely simple circuit.

In other words, when the input a.c. voltage exceeds a predetermined voltage level, a d.c. power is supplied to a load by an output from the rectifier circuit. On the other hand, in a region where the input a.c. voltage is not higher than the above predetermined voltage level, a charge is discharged from the electrical double layer capacitor through the discharge circuit connected to the iron core common to the primary side circuit, and the d.c. power is supplied to the load by the discharge power. Accordingly, even in the case of the power failure, in the region where the voltage is not higher than the slice level in the a.c. input waveform, since a voltage is supplied from the electrical double layer capacitor or the secondary battery, when being viewed from the load side, the stabilized flat output voltage having no concave over all time regions is applied, thereby being capable of remarkably improving the power factor. Also, the electrical double layer capacitor enables rapid charge and discharge operation, and also its capacitance is remarkably large to the degree of farad unit. Therefore, the electrical double layer capacitor is excellent in a long-period reliability, and even at the time of a momentary power failure of a minute unit, a sufficient power can be supplied to the secondary side circuit. Furthermore, because the switching is of the self-excitation type, an additional main part such as a PWM as in the conventional switching regulator is not required, which can greatly contribute to a reduction in the costs of the equipment and downsizing of the equipment.

As was described above, according to the present invention, a plurality of RCC circuits are connected to the iron core of one transformer, and an energy is applied to the secondary side circuit through any RCC circuit. Accordingly, even in any cases other than this embodiment described above, an energy can be applied from a natural energy such as a solar light generation or a wind power, a general-purpose diesel generator or the like, and a variety of energy can be totally used as a backup power supply at the time of the power failure, which extremely enhances the reliability.

In addition, since the electrical double layer capacitor or the secondary battery functions as the smoothing capacitor in the conventional rectifier circuit, this makes it unnecessary to use the smoothing capacitor at the primary side circuit. Further, because of the flyback system, no choke coil to be conventionally provided in the secondary side circuit is required. This contributes to a reduction in the costs, the downsizing, and an improvement in the power factor, and provides a switching power supply with a high performance which did not exist up to now.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An uninterrupted switching regulator, comprising:

a rectifier circuit for rectifying an alternating current from an a.c. power supply;

a primary side circuit for developing a primary side high frequency pulse voltage through a primary side switching element in which a primary winding of a high-frequency transformer and the primary side switching element are connected in series to an output side of the rectifier circuit, and a switching primary winding for applying a switching control voltage to the primary side switching element is connected to the output side of the rectifier circuit;

a secondary side circuit for applying a d.c. output power to a load in which a rectifying and smoothing circuit is connected to a secondary winding of said high-frequency transformer;

a charge circuit connected in series to a first tertiary winding of the high-frequency transformer and including an electrical double layer capacitor or a secondary battery and a rectifying device; and a discharge circuit in which a second tertiary winding connected in series to said first tertiary winding, a tertiary side switching element and said electrical double layer capacitor or secondary battery are connected in series to each other, and a switching tertiary winding for applying a switching control voltage to the tertiary side switching element is connected thereto, for developing a primary side high-frequency pulse discharge voltage from the discharge output of the electrical double layer capacitor or the secondary battery through said tertiary side switching element;

wherein an output is transmitted from the primary side and the tertiary side to the secondary side through, and said charge circuit operates when the output voltage of said rectifier circuit at the primary side exceeds a predetermined level, whereas said discharge circuit operates when it does not exceed the predetermined level.

* * * * *